DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 11, 1973

914 O.G. 399

T914,005

COATING COMPOSITIONS

Charles H. Coney, 2008 Canterbury 37660, and Glenna E. Burnett, 1701 John B. Dennis Bypass, Apt. 16 37664, both of Kingsport, Tenn.

Filed Sept. 1, 1972, Ser. No. 285,788

Int. Cl. C08b *21/08*

U.S. Cl. 260—15

No Drawing. 6 Pages Specification

Liquid coating composition comprising a cellulose ester of at least one monocarboxylic acid having 2 to 4 carbon atoms, a urea formaldehyde or melamine compound, a silicone compound and acid catalyst is disclosed. This composition is applied in solution and is thermosetting. When cured, it provides a release coating which also imparts scuff resistance, heat resistance, water resistance and chemical resistance to the coated substrate. The cellulose ester and urea formaldehyde are present in major proportions, while the silicone compound and acid catalyst are present in minor quantities.